United States Patent

[11] 3,587,296

| [72] | Inventor | Lawrence Brian Povoas<br>Somerset, England |
|---|---|---|
| [21] | Appl. No. | 777,647 |
| [22] | Filed | Nov. 21, 1968 |
| [45] | Patented | June 28, 1971 |
| [73] | Assignee | British Hovercraft Corporation Limited,<br>Yeovil, Somerset, England |
| [32] | Priority | Dec. 18, 1967 |
| [33] | | Great Britain |
| [31] | | 57340/67 |

[54] APPARATUS TO DETERMINE THE OUT OF BALANCE MOMENT OF AN OBJECT
12 Claims, 2 Drawing Figs.

[52] U.S. Cl. .................................................. 73/65
[51] Int. Cl. .................................................. G01m 1/12
[50] Field of Search ........................................... 73/65, 66, 480, 481, 482, 383; 177/(Inquired)

[56] References Cited
UNITED STATES PATENTS

| 3,154,161 | 10/1964 | Russell ......................... | 73/383 |
| 3,246,506 | 4/1966 | Wallace ......................... | 73/65 |
| 3,377,845 | 4/1968 | Conn .............................. | 73/65 |

*Primary Examiner*—James J. Gill
*Assistant Examiner*—Herbert Goldstein
*Attorney*—Larson, Taylor and Hinds ABSTRACT: An out of balance device incorporates a first platform which is adjustable relative to a horizontal plane and which supports above it a second platform by a gimbal device having orthogonal axes. Turning of the gimbal device about its axes is limited by a torsion device, and a measuring device measures the limiting torque load exerted by the torsion device. The second platform includes a leveling indicator.

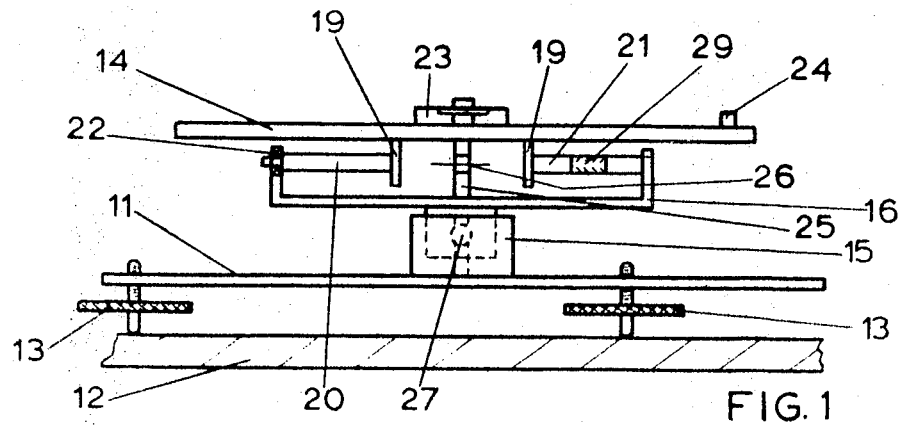
FIG. 1
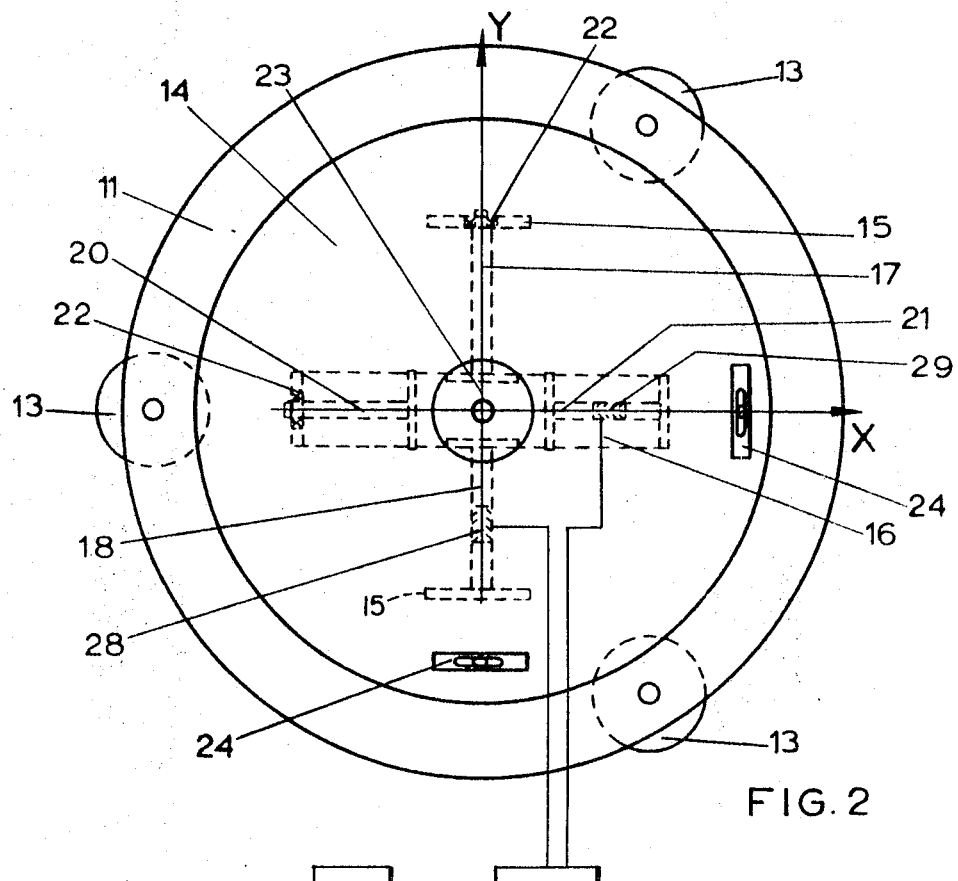
FIG. 2
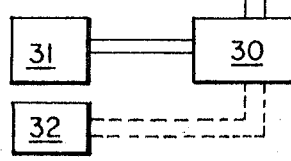

APPARATUS TO DETERMINE THE OUT OF BALANCE MOMENT OF AN OBJECT

This invention relates to apparatus for determining the out of balance moment about a vertical axis of an object.

Out of balance moments may be found by balancing an object with a known weight at a measured distance from a reference point. However, such a method requires much care and is tedious and time-consuming.

It is a purpose of the invention to enable the out of balance moment of an object to be measured quickly, simply and accurately.

According to the invention, there is provided an apparatus to determined the out of balance moment of an object, the apparatus including a first platform having adjustable means to tilt the first platform in relation to a horizontal plane and a second platform upon which the object is mounted. The second platform is supported from the first platform by gimbal means constructed to provide rotational freedom about two horizontal axes at right angles to each other to allow angular movement about a horizontal plane between the first platform and the second platform. The second platform includes means to locate the object in relation to the gimbal means and the second platform includes leveling indicators and the gimbal means includes torsion means located along the gimbal axis to limit the angular movement between the first platform and the second platform. Electrical means are provided to measure the limiting torque loads exerted by the torsion means.

From another point of view, the invention provides apparatus to determine the out of balance moment of an object, the apparatus including a first platform having adjustable means to tilt the first platform in relation to a horizontal plane and a second platform upon which the object is mounted. The second platform is supported upon the first platform by gimbal means constructed to provide rotational freedom about two horizontal axes at right angles to each other to allow angular movement about a horizontal plane between the first platform and the second platform. The second platform includes means to locate the object in relation to the gimbal axis, wherein the second platform includes leveling indicators and the gimbal means includes torsion means located along the gimbal axis to limit the angular movement between the first platform and the second platform. Electrical means are provided to measure the limiting torque loads exerted by the torsion means wherein the measure of the torsion indicates the out of balance moment of the object.

From yet another point of view, the invention provides an apparatus to determine the out of balance moment of an object, the apparatus including a first platform having adjustable means to tilt the first platform in relation to a horizontal plane and a second platform upon which the object is mounted. The second platform is supported upon the first platform by gimbal means constructed to provide rotational freedom about two horizontal axes at right angles to each other to allow angular movement about a horizontal plane between the first platform and the second platform. The second platform includes means to locate the object in relation to the gimbal axis and the second platform includes leveling indicators and the gimbal means includes two pairs of shafts, located along the gimbal axis, the centerline of one pair of shafts being perpendicular to the centerline of the other pair of shafts. At least one shaft in each pair of shafts in fixed at both ends to limit angular movement between the first platform and the second platform and torsion means in included to measure electrically the limiting torque in each of the shafts which are fixed at both ends.

The torsion means may include members having a limited amount of twist interconnecting the platforms and an intermediate part of the gimbal arrangement.

The torque measuring means may include foil strain gauge elements bonded to the torsion members and electrically arranged so as to form at least part of any suitable bridge configuration.

The sensitivity of the apparatus may be varied to suit the range of out of balance moments being measured by changing the torsion members which carry strain gauge elements.

The invention will now be described, by way of example, with reference to the accompanying drawings, in which:

FIG. 1 is an elevation of the apparatus according to the invention, and

FIG. 2 is a plan of the apparatus shown in FIG. 1.

A lower platform 11 is supported upon a substantially level surface 12 by three level adjusters 13. The spindles of the adjusters are threaded so that they may be screwed into and out of the platform 11, or into and out of structure affixed thereto, the adjusters being knurled to assist the screwing action.

Positioned above the lower platform 11 by means of a gimbal arrangement is an upper platform 14. The gimbal arrangement consists of two vertical members 15 on the upper surface of the lower platform 11 which provide support for an intermediate part 16 of the gimbal arrangement by means of shaft members 17 and 18. Similarly, two vertical members 19 on the underside of the upper platform 14 and shaft members 20 and 21 provide supports between the intermediate part 16 and the upper platform 14. As is usual in gimbal arrangements the axis of the shaft members 20 and 21 is at right angles to the axis of the shaft members 17 and 18, the axes being known as X and Y axes.

It is a feature of the invention that at least one of each pair of shaft members is fixed at each end. Thus, in the drawings, the shaft member 21 is fixed at one end to the vertical member 19 on the upper platform 14 and at the other end to the intermediate part 16. Similarly, the shaft member 18 is fixed at its ends to a vertical member 15 on the lower platform 11 and the intermediate part 16 respectively. Therefore, relative movement between the upper platform 14 and the lower platform 11 is limited to the twist in the shaft members 18 and 21, and these members are made from material having torque characteristics suitable for the moments to be measured.

If required, the shaft members 17 and 20 may also be fixed at each end, but as illustrated herein they are provided at one end with antifriction bearings 22.

The upper platform 14 is provided with a locating device 23 by which the object is positioned in relation to the X and Y axes and has indicators, for example, spirit levels, 24, to show when it is level.

A vertical load bearing member 25 having joints 26 and 27 which pivot respectively about the same axes as the pairs of shaft members, may be provided.

Electrical strain gauge elements 28 and 29 are bonded to the shaft members 18 and 21 respectively, and form parts of bridge systems. The two output signals from the bridge systems may be used to feed suitable measuring instruments 31 which will give readings corresponding to the torque as sensed. The measuring instruments 31 may be of the null balance type or of the direct readout type which may incorporate amplifiers.

The output signals may be used to feed an X-Y plotter 32.

In operation, the object is placed upon the upper platform and located by the locating device. If the center of gravity of the object is offset the upper platform will tilt. The upper platform is returned to the horizontal, as indicated by the sensors, by using the level adjusters to tilt the lower platform in opposition to the tilt of the upper platform.

The tilt in the lower platform generates reaction torques in the fixed shaft members, the magnitude of which is signalled by the bridge systems and fed to the appropriate indicators.

The apparatus may be used to determine the magnitude and position of the necessary weight to correct for an out of balance moment in an object.

The out of balance moment in any plane of the object may be determined by taking measurements of the moment with the object first in one plane and then in another plane at right angles to the first plane.

I claim:

1. Apparatus to determine the out of balance moment of an object, the apparatus including a first platform having adjustable means to tilt the first platform in relation to a horizontal plane and a second platform upon which the object is mounted, the second platform being supported upon the first platform by gimbal means constructed to provide rotational freedom about two horizontal axes at right angles to each other to allow angular movement about a horizontal plane between the first platform and the second platform, the second platform including means to locate the object in relation to the gimbal means, wherein the second platform includes leveling indicators and the gimbal means includes torsion means located along the gimbal axes to limit the angular movement between the first platform and the second platform and electrical means to measure the limiting torque loads exerted by the torsion means.

2. Apparatus as claimed in claim 1, wherein the torsion means includes members having a limited amount of twist interconnecting the platforms and an intermediate part of the gimbal means.

3. Apparatus as claimed in claim 2, wherein the torque measuring means includes foil strain gauge elements bonded to the members having a limited amount of twist and electrically arranged as at least part of a bridge circuit.

4. Apparatus as claimed in claim 3, wherein the output from the bridge circuit is fed to measuring instruments of the null balance type.

5. Apparatus as claimed in claim 3, wherein the output from the bridge circuit is fed to an X-Y plotter.

6. Apparatus as claimed in claim 3, wherein the gimbal means includes torsion members fixed at each end and torsion members rotatable at one end in antifriction bearings.

7. Apparatus as claimed in claim 6, wherein the torsion members fixed at each end are interchangeable with other members having different torque characteristics to suit the range of out of balance moments being measured.

8. Apparatus as claimed in claim 7, wherein the adjustable means to tilt the first platform includes three independent spindles threaded to be screwed into and out of the first platform.

9. Apparatus as claimed in claim 8, wherein a vertical load bearing member having joints which pivot about the same axes as the gimbal axes interconnects the first platform and the second platform.

10. Apparatus as claimed in claim 9, wherein the output from the bridge circuit is amplified and fed to measuring instruments of the direct readout type.

11. Apparatus to determine the out of balance moment of an object, the apparatus including a first platform having adjustable means to tilt the first platform in relation to a horizontal plane and a second platform upon which the object is mounted, the second platform being supported upon the first platform by gimbal means constructed to provide rotational freedom about two horizontal axes at right angles to each other to allow angular movement about a horizontal plane between the first platform and the second platform, the second platform including means to locate the object in relation to the gimbal axes, wherein the second platform includes leveling indicators and the gimbal means includes torsion means located along the gimbal axes to limit the angular movement between the first platform and the second platform and electrical means to measure the limiting torque loads exerted by the torsion means, the measure of the torsion being arranged to indicate the out of balance moment of the object.

12. Apparatus to determine the out of balance moment of an object, the apparatus including a first platform having adjustable means to tilt the first platform in relation to a horizontal plane and a second platform upon which the object is mounted, the second platform being supported upon the first platform by gimbal means constructed to provide rotational freedom about two horizontal axes at right angles to each other to allow angular movement about a horizontal plane between the first platform and the second platform, the second platform including means to locate the object in relation to the gimbal axes, wherein the second platform includes levelling indicators and the gimbal means includes two pairs of shafts, located along the gimbal axes, the centerline of one pair of shafts being perpendicular to the centerline of the other pair of shafts, at least one shaft in each pair of shafts being fixed at both ends to limit the angular movement between the first platform and the second platform and torsion means to measure electrically the limiting torque in each of the shafts which are fixed at both ends.